United States Patent [19]
Zdepski et al.

[11] Patent Number: 5,258,928
[45] Date of Patent: Nov. 2, 1993

[54] PARTS EFFICIENT MEMORY BASED FUNCTIONAL CIRCUIT HAVING SELECTABLE TRANSFER CHARACTERISTICS

[75] Inventors: Joel W. Zdepski, Lebanon, N.J.; James J. Gibson, Princeton, both of N.J.

[73] Assignee: RCA Thomson Licensing Corporation, Princeton, N.J.

[21] Appl. No.: 630,606

[22] Filed: Dec. 20, 1990

Related U.S. Application Data

[63] Continuation-in-part of Ser. No. 518,346, May 3, 1990, abandoned.

[51] Int. Cl.⁵ .............................................. G11C 15/04
[52] U.S. Cl. ..................................... 364/553; 358/166
[58] Field of Search ............... 364/724.19, 553, 724.21; 358/166

[56] References Cited

U.S. PATENT DOCUMENTS

| | | | |
|---|---|---|---|
| 4,212,072 | 7/1980 | Huelsman et al. | 358/166 |
| 4,329,708 | 5/1982 | Yamamoto et al. | 358/166 |
| 4,335,427 | 6/1982 | Hunt et al. | 358/166 |
| 4,355,304 | 10/1982 | Kasuga et al. | 340/347 |
| 4,365,304 | 12/1982 | Ruhman et al. | 358/166 |
| 4,435,792 | 3/1984 | Bechtolsheim | 358/166 |
| 4,445,138 | 4/1984 | Zwirn et al. | 358/166 |
| 4,516,167 | 5/1985 | Dion et al. | 358/160 |
| 4,518,994 | 5/1985 | Schnitzler | 358/133 |
| 4,575,749 | 3/1986 | Acampora et al. | 358/27 |
| 4,621,290 | 11/1986 | Fling | 358/166 |

FOREIGN PATENT DOCUMENTS 2203012  10/1988  United Kingdom .

OTHER PUBLICATIONS

Acampora et al. "Noise Reduction In Video Signals Using Pre/Post Signal Processing In A Time Division Multiplexer Component System" RCA Review vol. 47, Sep. '86 pp. 303–306.

T. Takegahara et al "Sound Transmission for HDTV Using Baseband Multiplexing Into Muse Video Signal" IEEE Trans. on Broadcasting, vol. BC-33, No. 4, Dec. 87.

*Primary Examiner*—Jack B. Harvey
*Assistant Examiner*—Thomas Peeso
*Attorney, Agent, or Firm*—Joseph S. Tripoli; Eric P. Herrmann; Ronald H. Kurdyla

[57] ABSTRACT

A processing system requiring adaptive selection of ones of a family of transfer functions is implemented with a single transfer function element arranged to perform a transfer function representative of the family of functions. Respective ones of the family of transfer functions are realized by selectively offsetting signal applied to the transfer function element, and selectively offsetting and scaling signal provided by the transfer function element.

13 Claims, 6 Drawing Sheets

PARTS EFFICIENT MEMORY BASED FUNCTIONAL CIRCUIT HAVING SELECTABLE TRANSFER CHARACTERISTICS

This is a continuation-in-part of application Ser. No. 07/518,346 filed May 3, 1990 now abandoned.

This invention relates to circuitry of the type which uses memory devices to perform desired transfer functions. An example of such circuitry is an adaptive compandor using a memory programmed with a plurality of compansion functions, wherein the signal to be companded is applied as address codes to the memory device.

BACKGROUND OF THE INVENTION

It is known in the art of digital signal processing to use memory devices as functional elements. The memory device is programmed at respective memory locations with values corresponding to address values transformed by a desired transfer function. For example, if it is desired to scale a digital signal by a particular value, each memory location is programmed with a value equal to the address of the particular memory location multiplied by the scaling value. The system may be made adaptive by segmenting the memory device into tables, each of which corresponds to the address values being multiplied by a different scale factor. The particular table utilized at any given time is accessed by appending control bits to the address codes.

Not all transfer functions can be realized with memory elements in a cost effective manner. Conversely, some transfer functions can only be realized using programmed memories. This is particularly true for certain non-linear functions. Unfortunately the memory devices may become undesirably large. Consider for example an adaptive system processing 8-bit samples, a memory with 8-bit precision, and 8-bit adaptive control signals. The required memory includes $2^8$ tables having $2^8$ memory locations of 8 bits each or a total memory capacity of 524,288 bits. A memory of this size will impose appreciable cost to the system.

The present inventor realized that for certain families of transfer functions that are implemented in adaptive systems, the memory requirements may be significantly reduced. This is achieved by storing values corresponding to only one representative transfer function in memory. Then by appropriately offsetting the signal applied to the memory and scaling the values provided by the memory, responses corresponding to others of the family of transfer functions may be effectively realized.

SUMMARY OF THE INVENTION

The present invention is an adaptive system for processing a signal according to a selected one of a plurality of transfer functions. A memory device is programmed at respective address locations with values corresponding to address values transformed by a transfer function representative of a family of transfer functions.

Signal is applied to the address input port of the memory device through a signal offset circuit, and transformed signal is accessed from the memory device via a further signal offset circuit. Scaling circuitry is included in the signal path either at the input to or the output from the memory device. Means responsive to a control signal apply appropriate offset values to the respective signal offset circuits and scaling values to the scaling circuitry to effect transformation of the applied signal by the desired one of a family of transfer functions.

DETAILED DESCRIPTION

The invention is described below in the environment of a compansion system, however its utility is not restricted to this use. It will be appreciated that the invention is applicable to any system requiring selectable transfer functions which transfer functions conform to a family of functions that can be substantially derived from a single representative transfer function.

Figure 1:
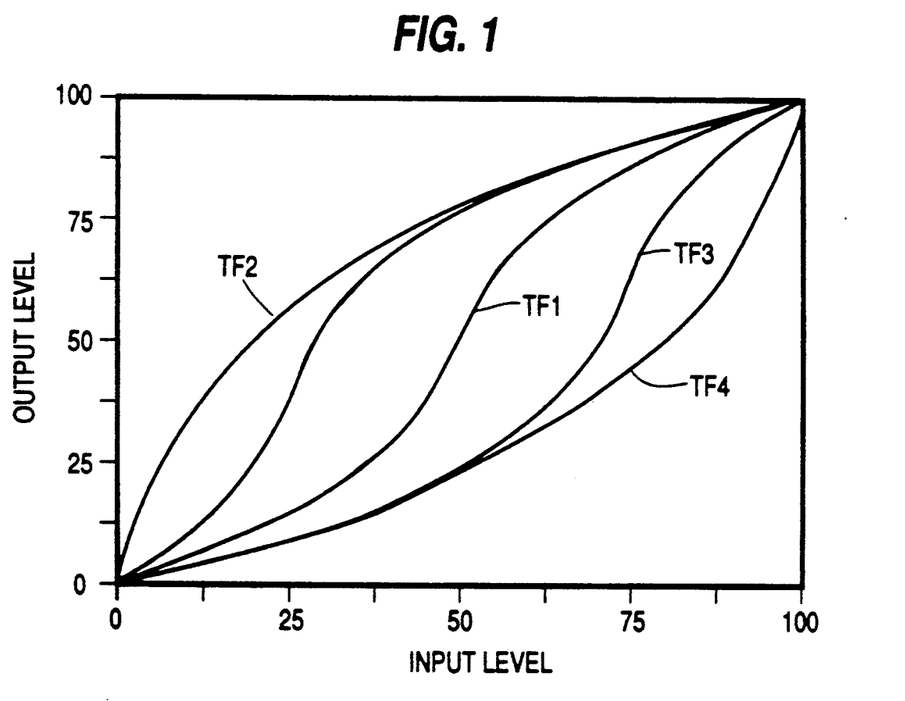
FIG. 1 is a graph of a portion of a family of transfer characteristics which can be realized with the present invention.

Refer to FIG. 1 which graphically illustrates a family of curves representing a plurality of compandor transfer functions. Each curve represents a particular input-output relationship which may be employed for particular signal conditions. For example, if it is known for a particular time interval the input signal is most likely to have values of $50 \pm \Delta$ ($\Delta$ a small value), then the curve labeled TF1 may represent the desired input-output relationship. Alternatively, if for a particular time interval the input signal is expected to have a value of $0 + \Delta$, then the curve labeled TF2 may represent the desired input-output relationship. From the figure it can be seen that the curves have the same general shape as the curve TF1 or a portion of TF1. The curve labeled TF3 is similar to curve TF1 but shifted rightward and upward. The curve TF4 is similar to curve TF1 but shifted leftward and downward, etc. Note further that if the curve TF4 is translated leftward and downward by 100 units, the combination of curves TF2 and TF4 will have the same general shape as the curve TF1. Finally, assume that the curves shown only represent a small portion of the family of transfer functions desired, i.e., that between curves TF2 and TF4 there are actually a large number of curves.

The dynamic range of the output values for the family of transfer functions is equal to the dynamic range of possible input values. This is a feature of the exemplary compandor systems described herein below, but is not a requirement of the invention.

Figure 2:
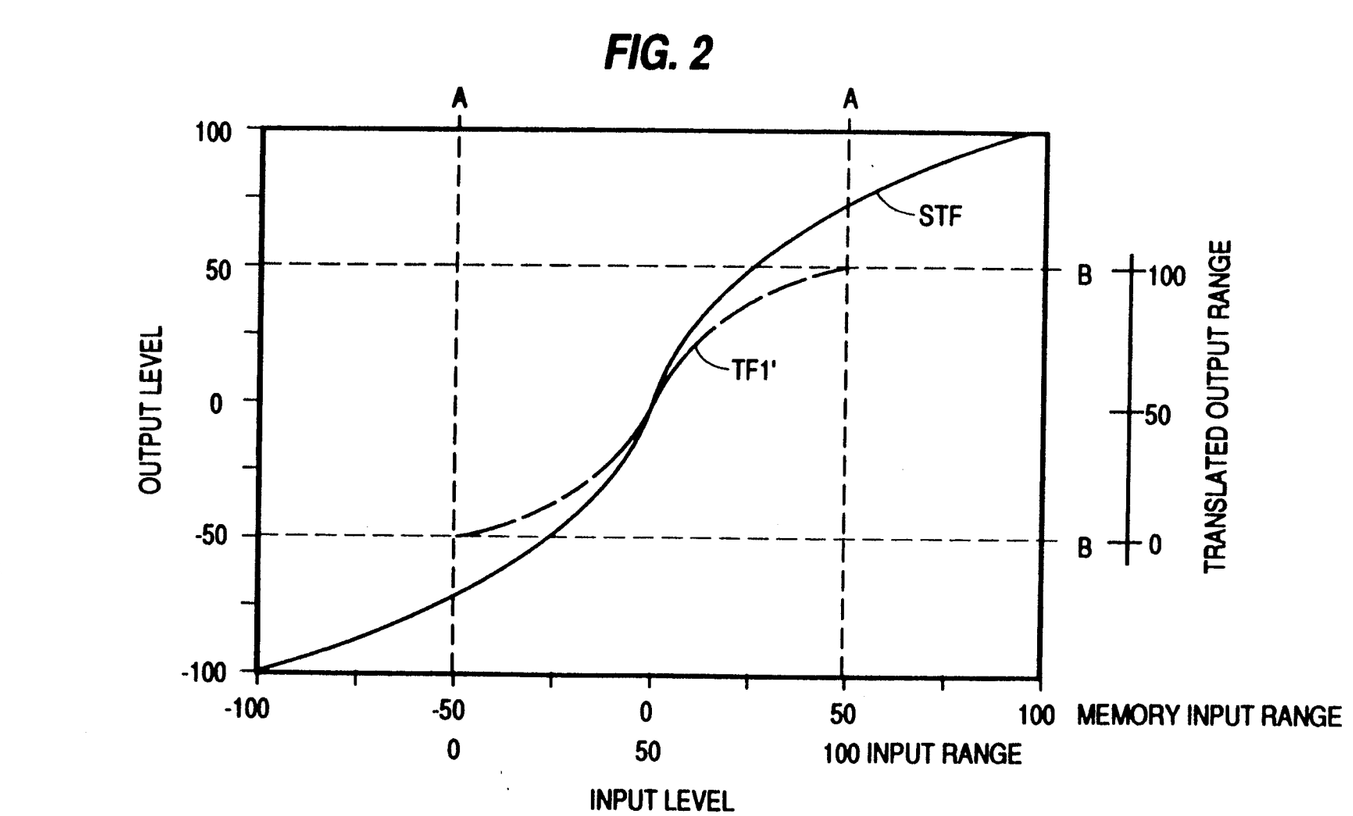
FIGS. 2 and 3 are graphs of a single transfer characteristic representative of the family of characteristics illustrated in FIG. 1 and useful in describing the operation of the invention.

Refer to FIG. 2 which illustrates a transfer function STF representative of the family of transfer functions shown in FIG. 1. In this example the standardized transfer function STF may be derived from the combination of transfer functions TF2 and TF4 connected end-to-end. Note that in FIG. 2 the input and output dynamic range is twice the input and output dynamic range of the transfer function of FIG. 1.

Assume a memory device is programmed to output values indicated by the transfer function STF for the corresponding input levels applied as address codes to its address input port. Assume further that the input signal has a dynamic range of 0 to 100 and that it is desired to realize the transfer function TF1.

The inflection point of the curve TF1 is at an input level of 50. The inflection point of the curve STF is at an input level of zero. To apply the transfer function at the inflection point of the curve STF to the input signal level of 50, the input signal is offset by negative 50 units. Offsetting the input signal applied to the memory device by 50 units established the dynamic range of the input levels applied to the memory from −50 to +50 units. This dynamic range of 100 units falls between the dashed lines designated AA. The desired output dynamic range is 100 units for the transfer functions shown in FIG. 1. However, it is seen from FIG. 2 that the output dynamic range produced by the transfer function STF for the input range between lines AA is approximately 150 units. The dynamic range of the output signal may be constrained to 100 units by scaling the output values provided by the memory by the factor 100/150 or ⅔. Scaling the output values constrains the dynamic range to fall between the dashed lines BB in FIG. 2 and produces the transfer function labeled TF1'. Depending upon the method of generating the curve STF, relative to the conformity of the family of transfer functions to a single curve, the transfer function TF1' will conform exactly to the function TF1 or very closely approximate the function TF1.

There is one further requirement to render the scaled output values (TF1') in conformance with the transfer function TF1. The output dynamic range of the scaled values is from −50 to +50 units. The desired output dynamic range is 0 to 100 units. Thus the scaled output values must be offset by a positive 50 units.

Figure 3:
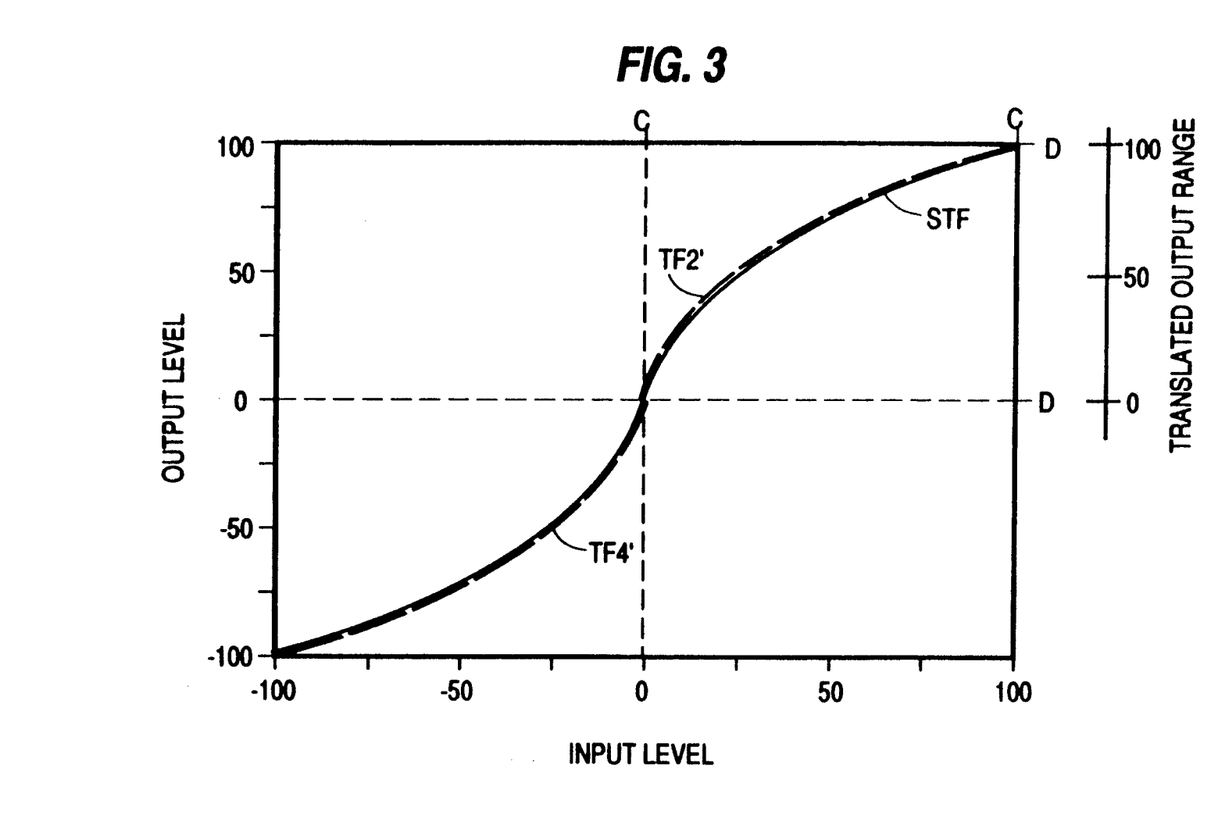

Refer to FIG. 3 and assume that the desired transfer function is TF2. Assuming that the inflection point of the curve TF2 is at zero units, and that the inflection point of the curve STF is at 0 units, the range of input levels applied to the memory is the range between the dashed lines C,C. For both FIG. 1 and FIG. 2 this range is 0 to 100 units, thus no offset is required to be applied to the input signal applied to the memory. Between the dashed lines C,C, the output dynamic range defined by the curve STF is 100 units, thus no scaling is required of the output values. In addition no offset is required to be applied to the output values.

The transfer function TF4 is realized by using that portion of the curve STF to the left of the dashed line C centered on zero units. In this instance the signal input values must be offset by negative 100 units and the signal output values must be offset by positive 100 units. However, no scaling is required of the output values.

Assume that all of the transfer functions of the desired family and the representative function are monotonic. The input offset value $IO_i$ is determined by a comparison of the desired function against the representative function. This may be performed graphically or numerically depending upon the shape or symmetry of the functions. Assume that the output value provided by the standard function STF for an input value x is F(x). Assume still further that the input signal range extends from a minimum value $x_n$ to a maximum value $x_x$ and that the desired output dynamic range for respective ones of the family of functions is $OR_i$. The scale factor $G_i$ for the particular selected function is determined from the relation $$G_i = OR_i / (F(x_x - IO_i) - F(x_n - IO_i)) \qquad (1)$$

where $(F(x_x - IO_i)$ and $F(x_n - IO_i)$ correspond to the maximum and minimum values provided in accordance with the function STF for the offset input range. The quotient represents the ratio of the desired output dynamic range to the output dynamic range of the function STF for the given input range of values applied to the memory address input.

The output offset value $OO_i$ is determined as follows for a system where scaling precedes the application of the output offset value. Let $F_i(x_n)$ equal the maximum output level for the respective desired transfer function. Then it is desired that $$F_i'(x_n) = G_i \times F(x_n - IO_i) + OO_i \qquad (2)$$

or $$OO_i = F_i'(x_n) - G_i \times F(x_n - IO_i) \qquad (3)$$

Output offsetting may be performed prior to scaling. In this instance the scale factors $G_i$, do not change but the respective values $OO_i'$ are different. The values $OO_i'$ are determined from the relation $$F_i'(x_n) = G_i \times (F(x_n - IO_i) + OO_i) \qquad (4)$$

or $$OO_i' = F_i(x_n)/G_i - F(x_n - IO_i) \qquad (5)$$

The values $G_i$, $OO_i$ and $IO_i$ are preprogrammed in a second memory which is addressed by a control signal $C_i$ at appropriate time intervals. Responsive to the control signals $C_i$, the values $G_i$, $OO_i$ and $IO_i$ are applied to circuitry coupled in the signal path with the transfer function memory to perform the desired offsetting and scaling functions.

Considering 8-bit input samples, 8-bit output samples and $2^8$ different transfer functions, the required memory for the present system is calculated as follows. The memory for storing the standard function has $2^9 \times 8 = 4,096$ bits (note the STF memory has twice the input dynamic range). Each of the $2^8$ transfer functions requires three values ($G_i$, $OO_i$ and $IO_i$) which are assumed to be 8-bits, for a total of $8 \times 3 \times 2^8 = 6,144$ bits. The total system bit count is 10,240 bits or a savings of 514,048 bits.

Figure 4:
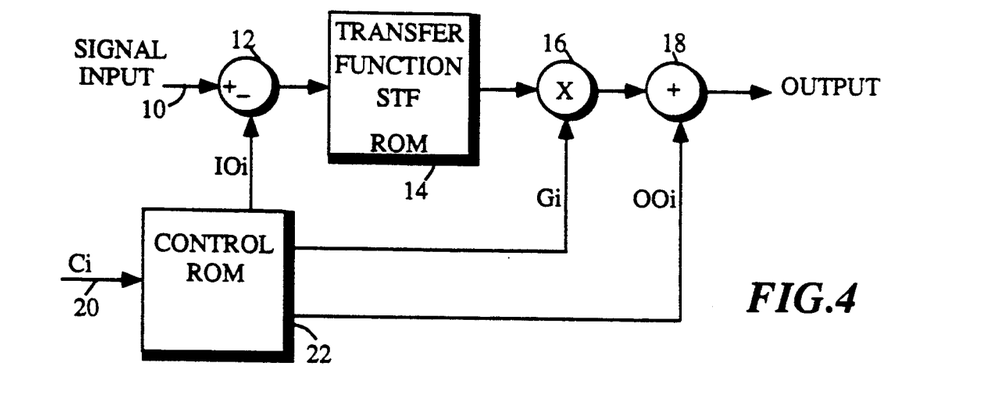
FIGS. 4, 5 and 8 are block diagrams of alternative embodiments of the invention.

FIG. 4 illustrates one embodiment of apparatus for performing the invention. In the figure the signals are presumed to be parallel-bit pulse code modulated (e.g., PCM binary) signals, and the connections are parallel conductor busses. Signal to be processed is applied to an input terminal 10 and control values $C_i$ are applied to a control terminal 20. The control values may be derived from various sources depending upon the function to be accomplished. For example, if the process function is signal companion, the control values may represent the signal-to-noise ratio of the input signal and be derived from signal/noise apparatus (not shown). Alternatively, the control values $C_i$ may represent predictions of the input signal level and be derived via maximum likelihood techniques, mean square error techniques or linear prediction methods, etc. The input signal is coupled to signal offset circuitry 12 shown as a subtractor. Output values from the input offset circuit 12 are applied to the address input port of a read only memory (ROM)14 which is preprogrammed with a transfer function representative of a family of transfer functions. The ROM 14 provides output sample values to a scaling circuit 16. Sealed samples generated by the scaling circuit 16 are coupled to output offset circuitry 18, shown as an adder. Output signal from the output offset circuitry 18 corresponds to the input signal transformed by the desired transfer function.

The control signal $C_i$ is coupled to a control ROM 22 which is preprogrammed with respective offset and scale factor values $IO_i$, $OO_i$ and $G_i$, corresponding to respective control signals $C_i$. The ROM provides input offset values $IO_i$ to the input offset circuitry 12, output offset values $OO_i$ to the output offset circuitry 18, and scale factors $G_i$ to the scaling circuit 16. Note that the offset circuitry 12 and 18 may be realized with either signal addition or subtraction circuits with appropriate choice of the polarity of the offset values programmed in the control ROM22.

Figure 5:
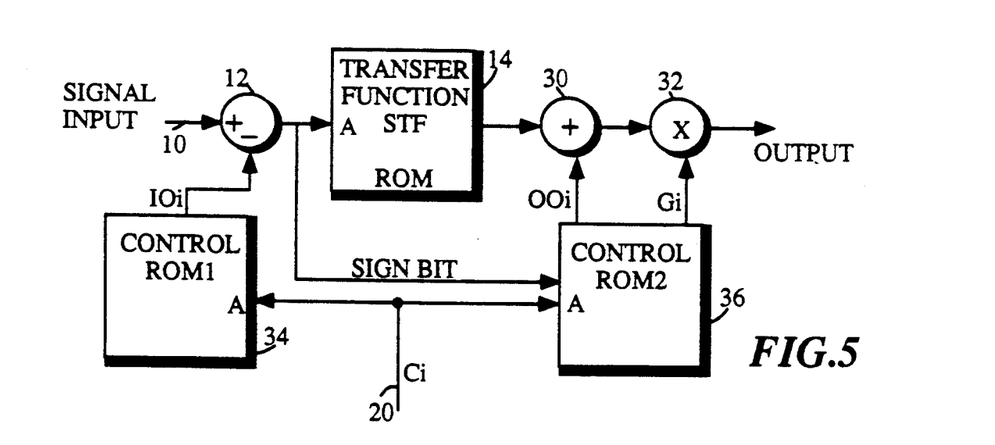

FIG. 5 illustrates a second embodiment wherein the scaling circuit 32 and the output offset circuitry 30 are coupled in reverse order relative the scaling and offset circuits 16 and 18 in FIG. 4. In addition the control ROM is divided into two ROM circuits, control ROM1 and control ROM2. One further difference is the application of the sign or polarity bit of the sample provided by the input offset circuitry 12 as an extra address bit to the control ROM2.

Consider first that the sign bit is not connected to control ROM2. Control ROM1 is programmed with offset values $IO_i$ and is responsive to control signals $C_i$. Control ROM2 is programmed with offset values $OO_i'$ and scale factors $G_i$ and the system provides the same input-output signal correspondence as the circuitry of FIG. 4.

Next consider that it is possible to predict the instantaneous value of the input signal and that there is a different transfer function for each input signal value. In this instance the control ROM1 may be eliminated. The predicted signal corresponds to the control signal $C_i$, and is applied directly to the subtracter 12 and to the address input of the control ROM 2. An example of this type of system is shown in FIG. 6.

Figure 6:
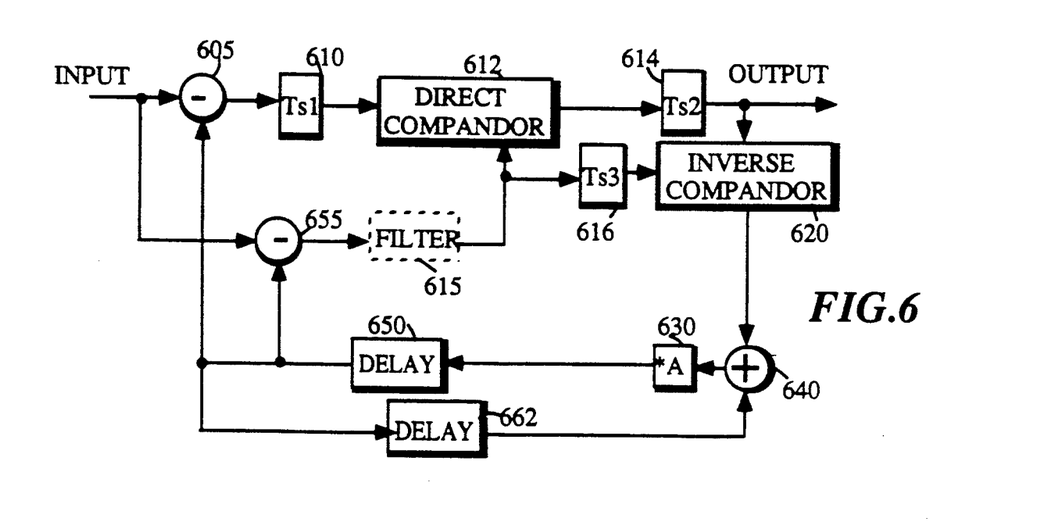
FIGS. 6 and 7 are block diagrams of alternative compansion systems wherein either the direct compandor or the inverse compandor or both may be realized with circuitry according to the present invention.

FIG. 6 illustrates a differential pulse code modulation (DPCM) system with adaptive compansion circuitry included in the DPCM loop. Input signal is applied to a first input terminal of a subtracter 605. A predicted video signal is coupled to a second input terminal of subtracter 605, the output of which is coupled to an adaptive compandor 612. The predicted video signal is substantially equal to the signal at the same pixel point in the previous image frame. The output signal from the subtractor 605 is thus equal to the difference of corresponding pixels in successive frames and nominally will be of small value. Output signal from the compandor 612 is coupled to an inverse compandor 620. Output signal from the inverse compandor 620 is coupled to an integrator including an adder 640, a scaling circuit 630 and delay elements 650 and 662. The delay imposed by the combination of elements 630, 650 and 662 is exactly one frame interval. The integrator integrates the signal differences provided by subtracter 605 to reconstruct the video signal in known fashion. Integrated signal from the delay element 650 is coupled as the predicted video signal to the subtractor 605. The total processing delay imposed by the elements coupled in series between the output and second input terminals of subtracter 605 is substantially one frame interval. Delay elements 610, 614 and 616 are included in the system to compensate for delays in generating the control signal for the adaptive compandors 612 and 620.

The input video signal and the predicted video signal are coupled to a second subtracter 655 which produces output differences equal to the differences generated by the subtracter 605. The output signal from subtracter 655 is thus an exact prediction of the input signal applied to the direct compandor 612. Thus the direct compandor 612 may be implemented with the circuitry of FIG. 5, with the control ROM 1 eliminated and the output of subtracter 655 applied directly to subtracter 12 (FIG. 4) and also as control signal to the address input port of the control ROM 2. As illustrated in FIG. 6 the circuitry provides DPCM signal at the OUTPUT for transmission or further processing.

Depending on the transfer functions implemented by element 612 it may be necessary to filter the control signals applied thereto to preclude the system from becoming unstable and exhibiting limit cycles for example. This additional filter is shown as element 615 drawn in phantom.

Figure 7:
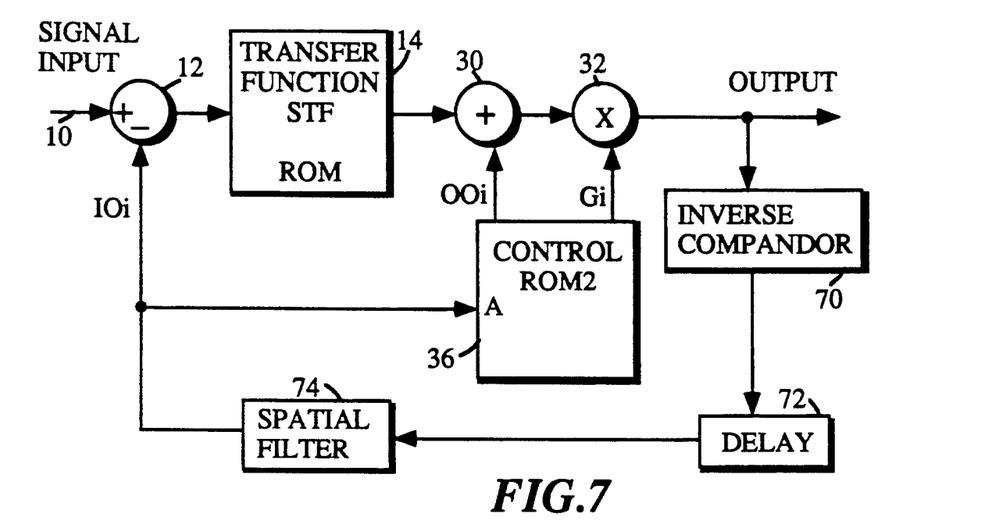

Alternatively, if it is desired to provide companded video signal as output signal rather than a companded DPCM signal, the system of FIG. 6 may be altered as shown in FIG. 7. The FIG. 5 compandor absent the control ROM1 is used as a direct compandor. Companded video signal from the scaling circuit 32 is used as an output signal OUTPUT, and is coupled to an inverse compandor 70 which restores the companded video signal to original form. Video signal from the inverse compandor 70 is coupled to a delay circuit 72 and delayed video signal is applied to for example a spatial filter 74. Spatial filter 74 in cooperation with the delay element 72, provides an estimate of the input signal. This estimate may be formed as the average of a number of pixels occurring a field or frame earlier and which average correspond to the pixel location represented by the current input signal sample.

The estimated signal is applied as input offset values $IO_i$ to the offset circuitry 12 and also as control values $C_i$ to the address input port of the control ROM2.

Referring back to FIG. 5 the system will be described with the inclusion of the sign bit from subtracter 12. In this instance the control ROM 2 will include two tables, each containing values $OO_i$ and $G_i$. The use of the sign bit is to modify the transfer function such that when the input signal equals the value $IO_i$, the output signal should equal $IO_i$. In effect the input signal passes through the system unchanged when it is equal to $IO_i$. The control ROM 2 includes a first table of scale factor values $G1_i$ and output offset values $OO1_i$ responsive to the control signals $C_i$ and a sign bit signal representing a negative polarity. The values $G1_i$ and $OO1_i$ are given by $$G1_i = -IO_i/F(IO_i) \qquad (6)$$

$$OO1_i = -IO_i/G1_i \qquad (7)$$

In addition the control ROM 2 includes a second table of scale factor values $G2_i$ and output offset values $OO2_i$ responsive to the control values $C_i$ and a sign bit signal representing a positive value. The values $G2_i$ and $OO2_i$ are given by $$G2_i = (x_x - IO_i)/F(x_x - IO_i) \quad (8)$$

$$OO2_i = -IO_i/G2_i \quad (9)$$

where $x_x$ is the upper limit of the dynamic range of the input signal.

Figure 8:
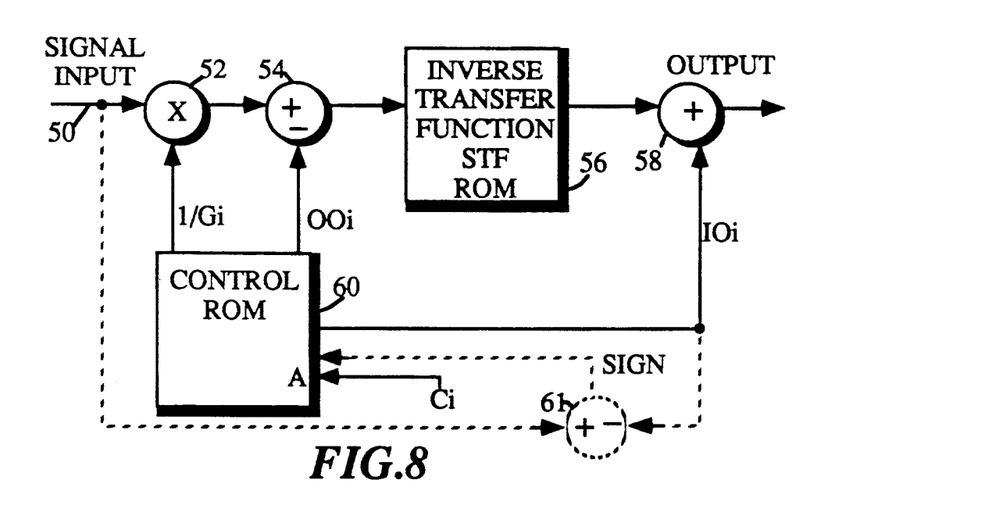

FIG. 8 illustrates a system for performing the inverse function of the system of FIG. 5. An inverse function may be realized with a system similar to FIG. 5 with appropriate programming of the respective memory elements. However if both a direct and inverse function is desired in a single circuit as illustrated in FIG. 6, it is desirable to minimize hardware. The amount of hardware can be minimized if both the direct and inverse functions use common control ROM's. Arranging the inverse function circuitry as illustrated in FIG. 8 permits the use of at least common output offset values $OO_i$ and common input offset values $IO_i$ for both the direct and inverse function circuits.

In FIG. 8 the input signal is applied to a scaling circuit 52 wherein it is scaled by values $1/G_i$ which values are the reciprocals of the values $G_i$ stored in the control ROM 1 (FIG. 5). The scaled input signal values are applied to offset circuitry 54 wherein they are offset by values $OO_i$, which values are equal to the output offset values stored in the control ROM 2 (FIG. 5). The values $1/G_i$ and $OO_i$ are provided by a control ROM 60 responsive to control signals $C_i$, which signals $C_i$ are equivalent to the control values $C_i$ applied to control ROM 1 and control ROM 2 (FIG. 5).

The scaled and offset input signal is applied as address codes to a transfer function ROM 56. ROM 56 is programmed with the same function STF as the ROM 14 in FIG. 5, only rotated. That is, considering FIG. 2, values corresponding to the input levels are programmed at address locations corresponding to respective output levels.

Output signal samples provided by the transfer function ROM 56 are coupled to an offset circuit 58 wherein the output samples are offset by the values $IO_i$ which are equivalent to the input offset values $IO_i$ stored in the control ROM 1 (FIG. 5). The values $IO_i$ are also provided by the control ROM 60.

The inverse function system may also be modified to be responsive to a polarity control signal. This is indicated by the auxiliary circuitry including subtracter 61 drawn in phantom.

Figure 9:
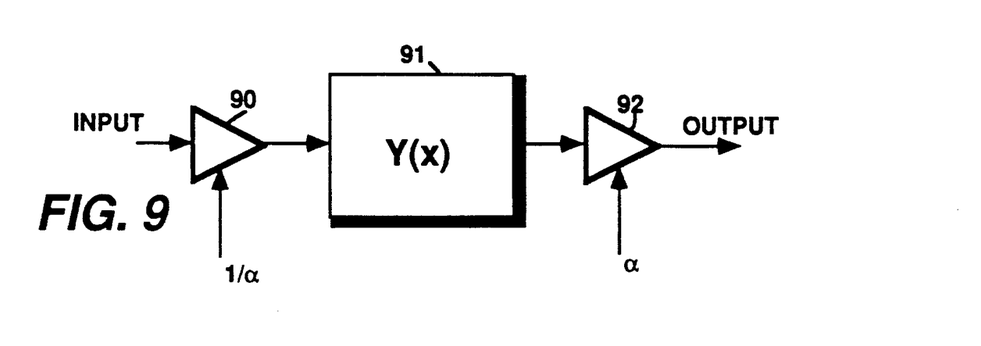
FIG. 9 is a block diagram of a further embodiment of the invention.

FIG. 9 illustrates another embodiment of the invention which will generate a family of transfer functions from a single transfer function. Consider, for example, the function Y(x) given by $$Y(x) = x/(1 + x^{2N}) \quad (10)$$

where x corresponds to the input signal and N is an integer. Y(x) is skew symmetric about zero, has a value of zero at $x=0$, tends toward zero for values of x greater than Xmax and less than Xmin and wherein Xmax and Xmin are equal to plus and minus the $2N^{th}$ root of $1/(2N-1)$ respectively. Consider also that it is desired to adaptively control the values of x defining Xmax and Xmin. This may be accomplished by scaling the values of x applied to the circuit performing the function Y(x). For example, if the input values x are scaled by the factor $1/\alpha$, $\alpha$ a positive value, such that the circuitry performing the function Y(x) operates on the values $x/\alpha$, the values of x defining Xmax and Xmin are $\alpha$ times the $2N^{th}$ root of $(1/2N-1)$. Thus the points of occurrence of Xmax and Xmin may be controlled by changing the values of $\alpha$. In order to maintain the output dynamic range of the signal Y(x) for the function of equation (10), the values provided by the function circuit may be scaled by the reciprocal of the input scale factor. FIG. 9 is an adaptive function generating circuit of this form.

In FIG. 9 inputs samples are applied to a scaling circuit 90 wherein the samples are scaled by a scale factor $1/\alpha$. The scaled samples $(x/\alpha)$ are applied to a functional circuit 91 which may be a ROM programmed with a desired transfer function. Transformed samples are coupled to a further scaling circuit 92, wherein the transformed samples are scaled by a scale factor $\alpha$. The scaling circuit provides the desired output values. Assuming that the transfer function performed by the circuitry 91 corresponds to the function defined by equation 10, the scaling circuit provides output samples of the form given by $$\text{OUTPUT} = x/(1 + (x/\alpha)^{2N}) \quad (11)$$

or more generally $$\text{OUTPUT} = \alpha Y(X/\alpha) \quad (12)$$

Note however that for some applications it may not be necessary to include the latter scaling circuit 92. In addition, if scaling circuit 92 is included, the scale factor applied thereto may have values different from the reciprocal of the values applied to the scaling circuit 90. Further, the scale factor $1/\alpha$, applied to the scaling circuit 90 is not meant to imply that the values $1/\alpha$ are limited to values less than 1, but may include values greater than 1. The scale factors $\alpha$ and $1/\alpha$ may be provided by a ROM responsive to appropriate control signals, or by other convenient circuitry to promote the desired adaptive response.

Figure 10:
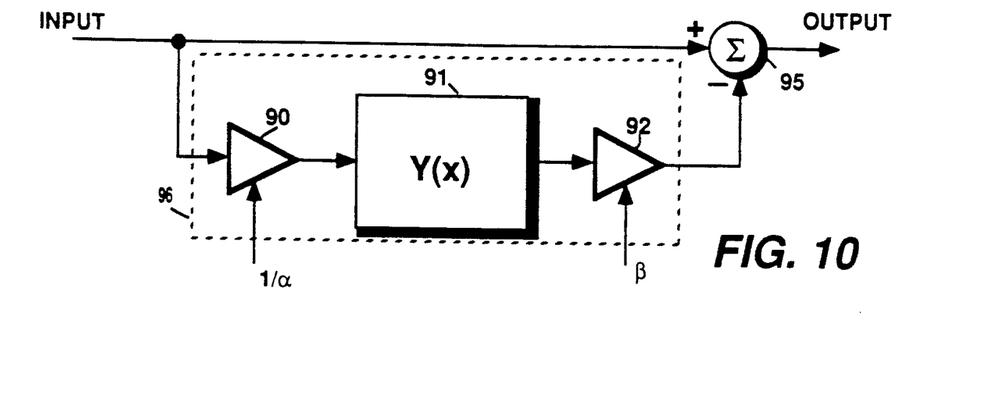
FIGS. 10 and 11 are block diagrams of alternative adaptive compansion circuits utilizing the circuitry illustrated in FIG. 9.

FIG. 10 illustrates a further embodiment of the invention for providing a plurality of transfer functions using an element (91) arranged to generate a single transfer function. In FIG. 10 (and FIG. 11) circuit elements designated with the same numerals as circuit elements in FIG. 9 are similar and operate in like fashion.

Input samples are applied to the minuend input terminal of a subtracter circuit 95, and to the input terminal of the adaptive functional circuitry 96. Output samples from the circuitry 96 are coupled to the subtrahend input terminal of the subtracter 95. The subtracter 95 provides output samples, OUTPUT in conformance with the function $$\text{OUTPUT} = x - \beta Y(x/\alpha) \quad (13)$$

Assume that the functional element 91 performs the function defined by equation 10 and that the scale factor $\beta$ is equal to $\alpha$. In this instance the output signal is equal to $$\text{OUTPUT} = x(1 - 1/(1 + (x/\alpha)^{2N})) \quad (14)$$

This function is similar to the function TF1 illustrated in FIG. 1, except that for larger values of the input signal the slope of the curve tends toward 1. The point of inflection of the curve is adjustable in accordance with the values $1/\alpha$ and $\alpha$ applied to the scaling circuits 90 and 92 respectively. Next assume that the scale factor $\beta$ is equal to b times $\alpha$. (b a variable). In this instance the output signal provided by subtractor 95 is given by $$\text{OUTPUT} = x(1 - b/(1+(x/\alpha)^{2N}))  \quad (15)$$

This arrangement permits establishment of the slope of the curve at x=0 to the value (1−b). Note the value N influences the steepness of the slope at the point of inflection, the larger the value N the greater the slope.

The function defined by equation 15 is useful as an adaptive noise coring circuit wherein the degree of attenuation or coring is determined by the factor $\beta$, and the range of signal over which coring is performed is determined by the factor $\alpha$. The factors $\alpha$ and $\beta$ may be selected as a function of the signal to noise ratio.

The functions defined by either equations (14) or (15) are also useful for performing adaptive compansion, similar to the function performed by the circuitry of FIG. 8. That is the circuitry of FIG. 10 may be utilized in a communications receiver to perform a complementary compansion function of signal which has been companded at a transmitter.

Figure 11:
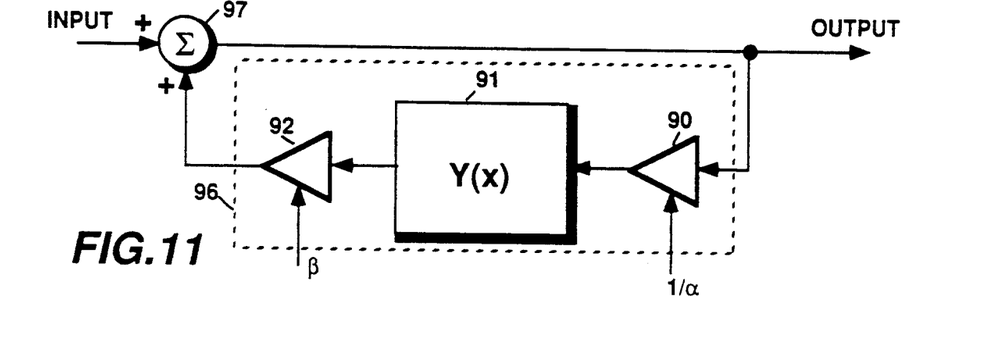

FIG. 11 illustrates circuitry for performing the complementary function of the circuitry illustrated in FIG. 10. The circuitry of FIG. 10 tends to compress smaller amplitude signal values and to expand (amplify) larger amplitude signal values, while the circuitry of FIG. 11 tends to expand smaller amplitude signal values and to compress larger amplitude signal values.

Figure 12:
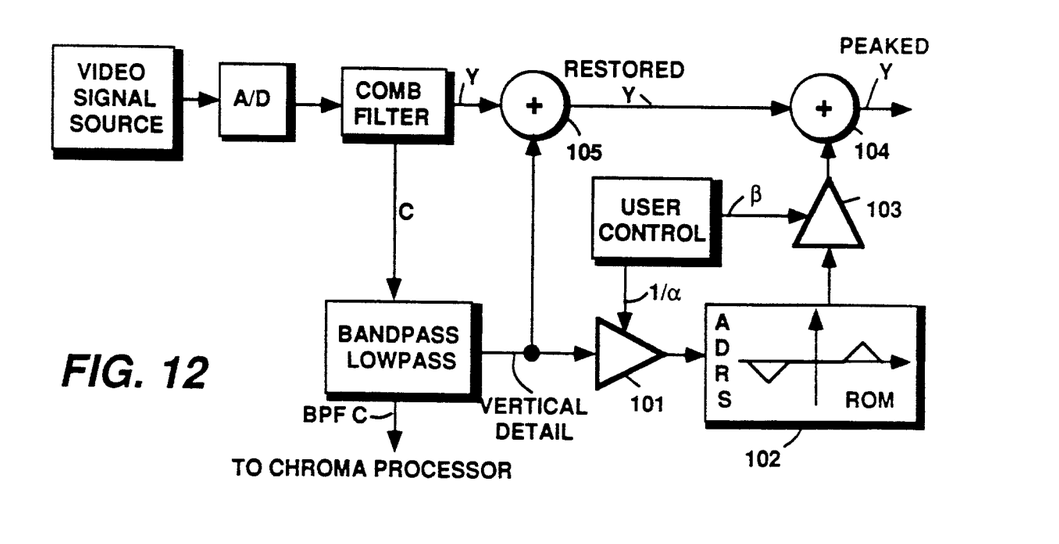
FIG. 12 is a block diagram of an adaptive peaking circuit embodying the invention.

FIG. 12 illustrates a further application wherein the invention is used to perform peaking control of a vertical detail signal in a television receiver. In FIG. 12 composite video signal is converted to digital form in an analog-to-digital converter (A/D) and comb filtered to separate the luminance, Y, and chrominance, C, components. The lower frequency spectrum of the comb filtered chrominance component contains luminance vertical detail which is separated by the bandpass/lowpass filter and added back to the luminance signal in the adder 105, to provide a restored luminance signal. The vertical detail signal is also processed by the circuitry 101, 102 and 103 to provide a cored, peaked and pared vertical detail signal which is added to the restored luminance signal in an adder 104 to generate a luminance signal with peaked vertical detail. The peaking function is well known, and desirably is arranged to be adjustable so that the user can adjust the displayed image according to his viewing preference. The general form of the transfer function applied to the vertical detail signal is illustrated in the block designated 102. Elements 101, 102 and 103 are arranged to operate similar to the elements 90, 91 and 92, respectively of FIG. 9 to permit the user to select one of a family of transfer functions. The user may select the portion of the dynamic range of the vertical detail signal to be peaked by changing the gain factor $\alpha$ and he may select the degree of peaking by adjusting the gain factor $\beta$.

What is claimed is:

1. Apparatus for selectively processing a signal according to one of a family of gain/attenuation transfer functions, comprising:

a signal input terminal for receiving an input signal to be processed, and a signal output terminal;

memory means having address input terminals and an output terminal, said memory means being programmed at respective address locations with values representing a single compansion transfer function corresponding to respective address values transformed by said single transfer function, which single transfer function is representative of said family of gain/attenuation transfer functions;

means for providing a plurality of offset values and a plurality of scale factors;

offset means, responsive to said offset values, for offsetting signal applied thereto;

signal scaling means, responsive to said scale factors, for scaling signal applied thereto; and means for serially coupling said memory means, said offset means and said signal scaling means, between said signal input terminal and said signal output terminal, wherein signal to be processed is applied to the address input terminal of said memory and transformed signal is output from said memory means output terminal; and wherein the combination of serially coupled memory means, offset means and signal scaling means is conditioned to perform different ones of said family of gain/attenuation transfer functions, by said means for providing offset values and scale factors, selectively applying associated pairs of offset values and scale factors to said offset means and scaling means respectively.

2. The apparatus set forth in claim 1
wherein said means for providing also provides further offset values, and said apparatus further includes;

a second offset means, responsive to said further offset values, for offsetting signal applied thereto;

means for serially coupling said memory means, said offset means, said second offset means, and said signal scaling means, between said signal input terminal and said signal output terminal, wherein said offset means is coupled between said signal input terminal and the address input terminal of said memory means, and said second offset means is coupled between the output terminal of said memory means and said signal output terminal.

3. The apparatus set forth in claim 1 wherein each of said respective scale factors correspond to a ratio of the range of values provided by said representative transfer function to a desired range of values to be provided by a respective one of said plurality of transfer functions.

4. A compandor for selectively performing a plurality of transfer functions comprising:

a signal input terminal for receiving an input signal to be processed, and a signal output terminal, said input signal constrained to a predetermined dynamic range;

means for providing control signals for selecting respective ones of said plurality of transfer functions;

means, responsive to said control signals, for selectively providing first offset values, second offset values, and scale factors;

first signal offset circuitry coupled to said signal input terminal and responsive to said first offset values for providing input signal offset by said first offset value;

memory means, having an address input port susceptible of supporting a dynamic range greater than said predetermined dynamic range and coupled to said first signal offset circuitry for receiving offset input signal, and programmed at respective address locations with values corresponding to address values transformed in accordance with a single transfer function representative of said plurality of transfer functions;

second signal offset circuitry, responsive to said second offset values, for offsetting signal applied thereto;

signal scaling circuitry, responsive to said scale factors for scaling signal applied thereto; and means for serially coupling said second signal offset circuitry and said signal scaling circuitry between said memory means and said signal output terminal.

5. Compansion apparatus for selectively performing a plurality of compansion transfer functions comprising:

a signal input terminal for receiving an input signal to be companded, and a signal output terminal;

memory means, having address input terminals and an output terminal, and programmed at respective memory locations with values corresponding to address values transformed by a single compansion function representative of said plurality of compansion transfer functions;

means for providing control values;

a source of a plurality of scale factors, responsive to said control values, for selectively providing respective scale factors;

signal scaling means, responsive to said scale factors, for scaling signal applied thereto; and means for serially coupling said memory means, and said signal scaling means, between said signal input terminal and said signal output terminal, wherein signal values are applied to said address input terminals.

6. The apparatus set forth in claim 5 further including:

a source of a plurality of further scale factors, responsive to said control values, for selectively providing respective further scale factors;

a further scaling circuit, responsive to said further scale factors, for scaling signal applied thereto by said further scale factors; and means for cascade coupling said scaling circuit, said memory means and said further scaling circuit between said signal input and said signal output terminals in the order recited.

7. The apparatus set forth in claim 6 further including:

a signal combining circuit, for combining at least two signals, having a first input terminal coupled to said signal input terminal, a second input terminal coupled to an output terminal of said further scaling circuit, and having an output terminal coupled to said signal output terminal.

8. The apparatus set forth in claim 5 further including:

a signal combining circuit, for combining at least two signals, having a first input terminal coupled to said signal input terminal, a second input terminal coupled to an output terminal of said serially coupled memory means and signal scaling means, and having an output terminal coupled to said signal output terminal.

9. The apparatus set forth in claim 5 further including:

a further signal input and a further signal output terminal a signal combining circuit, for combining at least two signals, having a first input terminal coupled to said further signal input terminal, a second input terminal coupled to said signal output terminal, having an output terminal coupled to said further signal output terminal, and wherein said signal input terminal is coupled to said further signal output terminal.

10. The apparatus set forth in claim 6 further including:

a further signal input and a further signal output terminal;

a signal combining circuit, for combining at least two signals, having a first input terminal coupled to said further signal input terminal, a second input terminal coupled to an output terminal of said further scaling circuit, and having an output terminal coupled to said further signal output terminal, and wherein said signal input terminal is coupled to said further signal output terminal.

11. The apparatus set forth in claim 6 wherein said source of a plurality of further scale factors provides further scale factors proportional to the reciprocal of said scale factors.

12. In a system for processing a video signal, apparatus for selectively performing a plurality of compansion transfer functions comprising:

a signal input terminal for receiving a video input signal to be companded, and a signal output terminal;

means for providing control values;

first circuit means coupled to said signal input terminal, and responsive to said control values, for performing one of a scaling and an offset to said video signal;

memory means, having an address input terminal coupled to said first circuit means for receiving video signal processed by said first circuit means, said memory means being programmed at respective address locations with values corresponding to address values companded by a single compansion function representative of said plurality of compansion transfer functions, wherein the combination of said memory means and said first circuit means are conditioned to provide different ones of said plurality of compansion transfer functions by said control means providing respective ones of said control values; and video signal utilization means coupled to said second circuit means.

13. The system set forth in claim 12 further including;

third circuit means, coupled between said memory means and said utilization means, and responsive to said control values, for performing one of a scaling and an offset to signal provided by said second circuit means.

* * * * *